March 11, 1930.                H. F. GRUMAN                 1,750,041
                                SEWING MACHINE
                             Filed Oct. 29, 1924         7 Sheets-Sheet 1
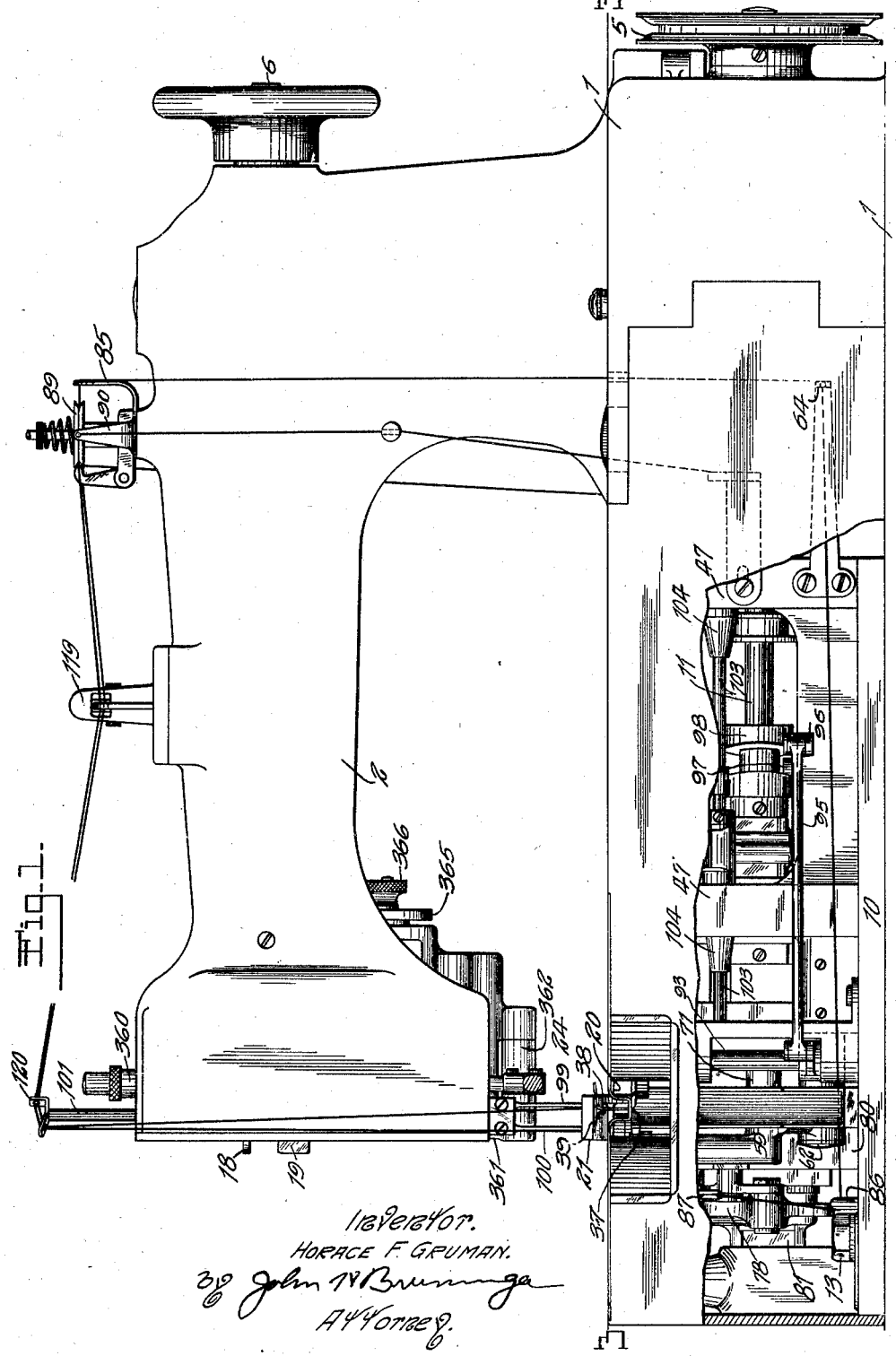

March 11, 1930.　　　H. F. GRUMAN　　　1,750,041
SEWING MACHINE
Filed Oct. 29, 1924　　　7 Sheets-Sheet 2
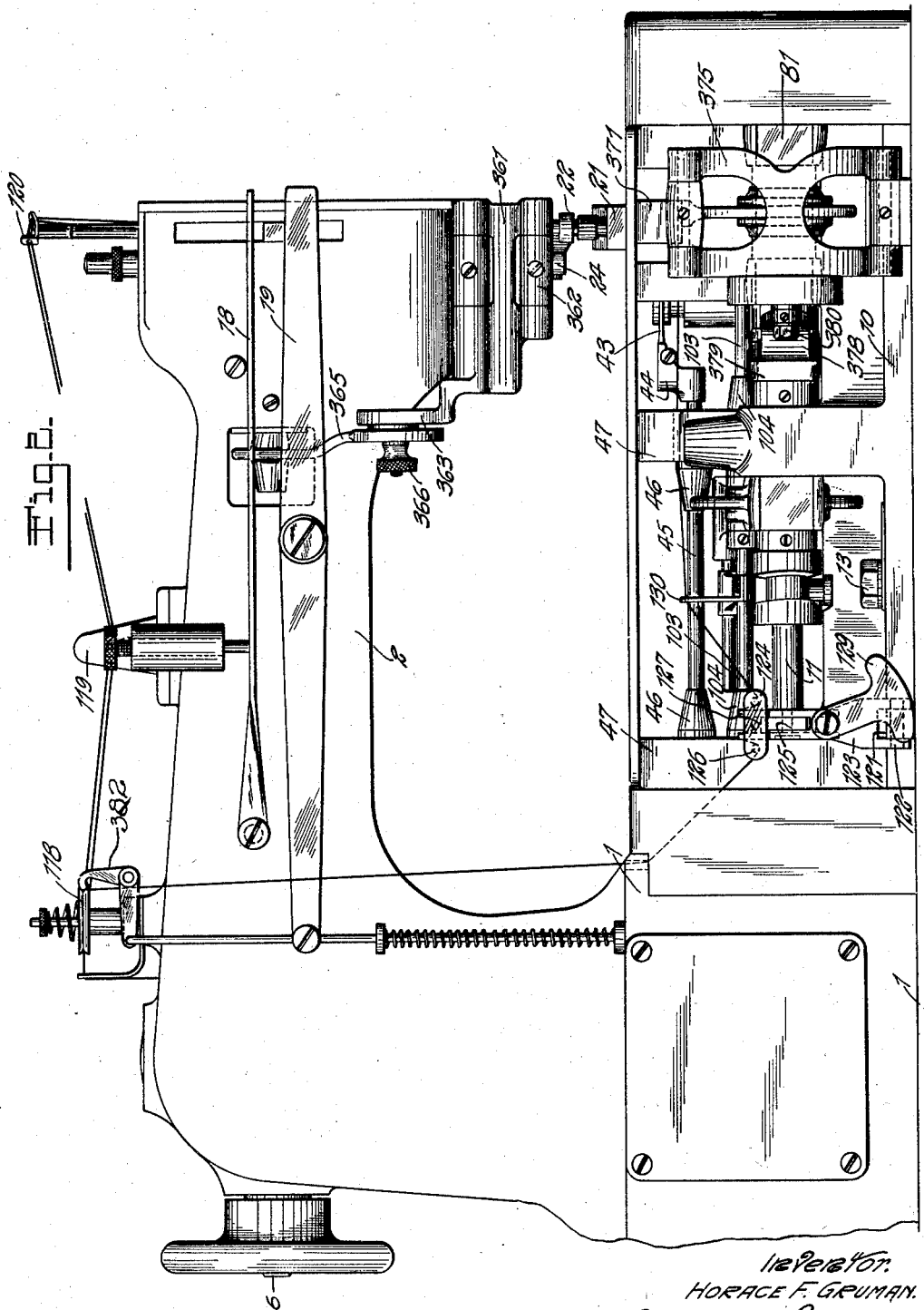
Inventor:
HORACE F. GRUMAN.
By John N Bruninga
Attorney.

March 11, 1930. H. F. GRUMAN 1,750,041
SEWING MACHINE
Filed Oct. 29, 1924 7 Sheets-Sheet 3
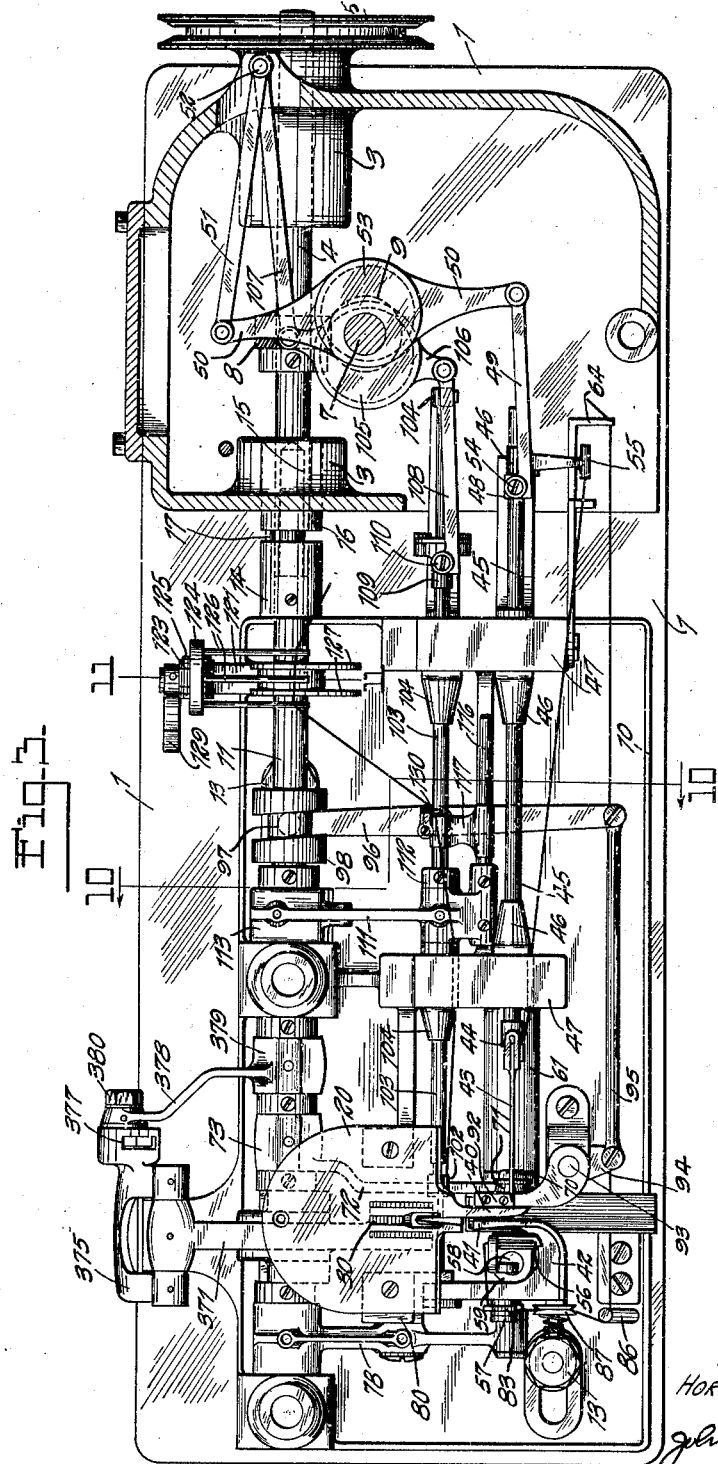

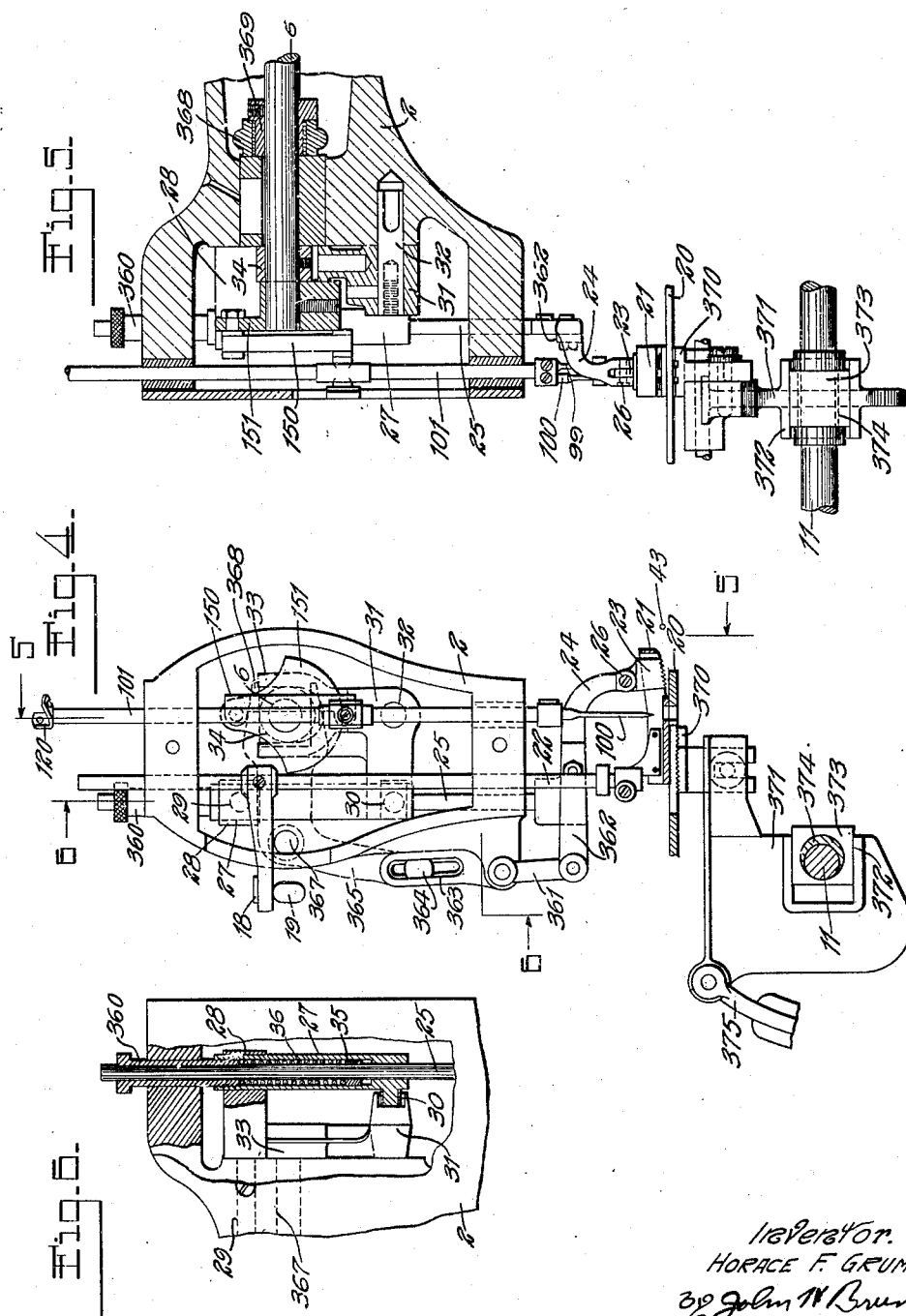

March 11, 1930. H. F. GRUMAN 1,750,041
SEWING MACHINE
Filed Oct. 29, 1924 7 Sheets-Sheet 5

Inventor.
HORACE F. GRUMAN.
Attorney

March 11, 1930. H. F. GRUMAN 1,750,041
SEWING MACHINE
Filed Oct. 29, 1924 7 Sheets-Sheet 6
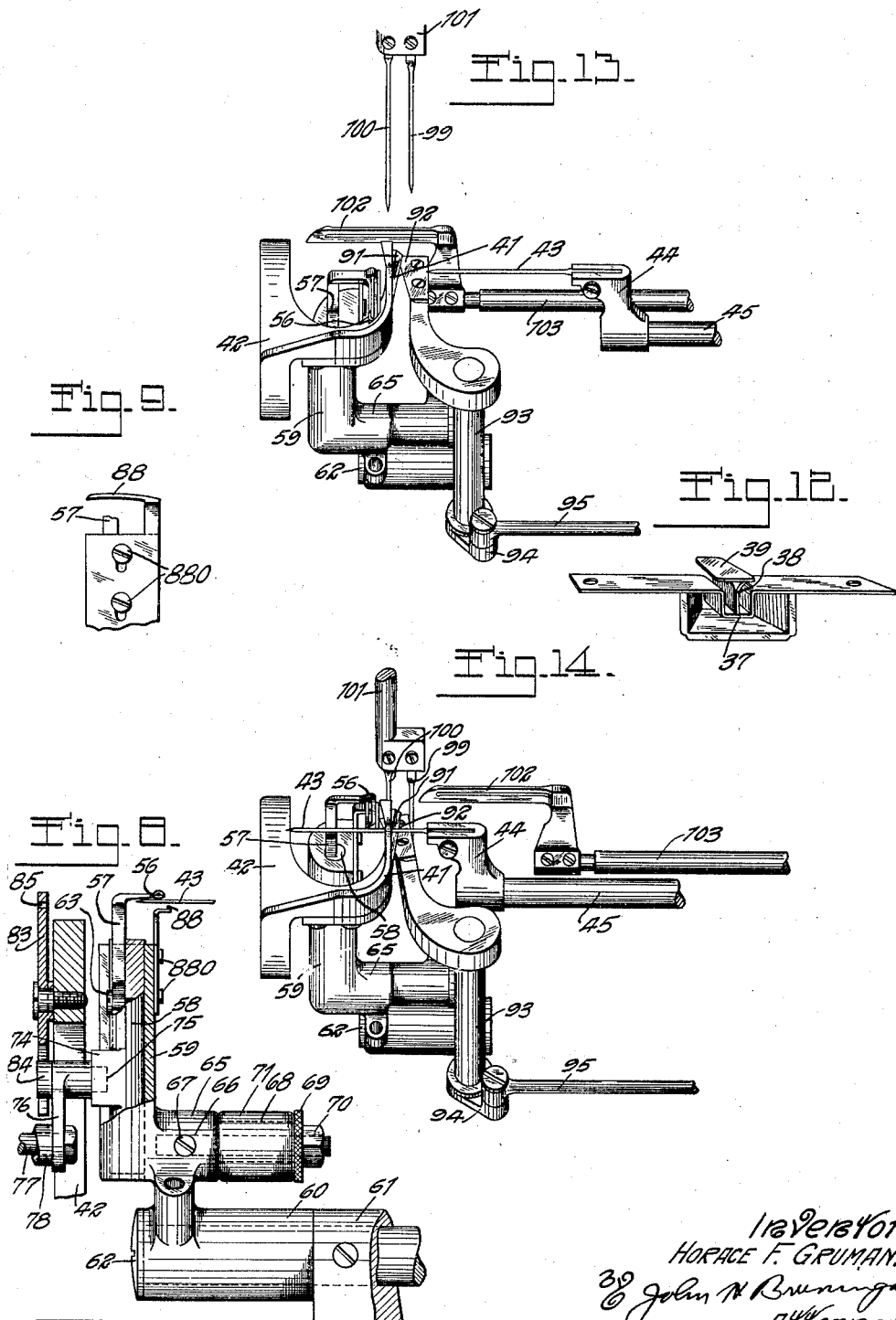

March 11, 1930.  H. F. GRUMAN  1,750,041
SEWING MACHINE
Filed Oct. 29, 1924   7 Sheets-Sheet 7
Fig. 15.  Fig. 16.  Fig. 17.
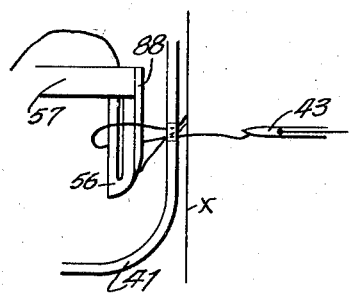
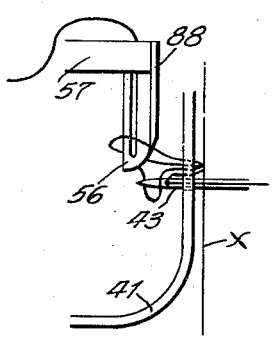
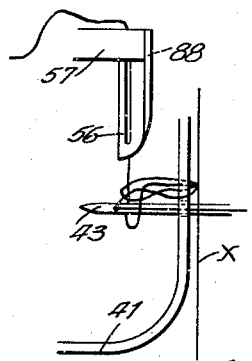
Fig. 18.
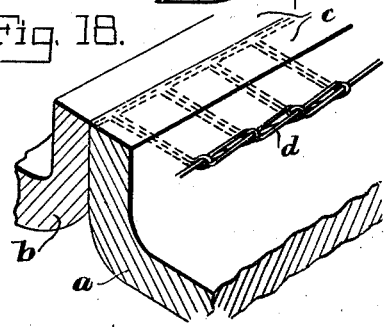
Fig. 19.  Fig. 20.  Fig. 21.
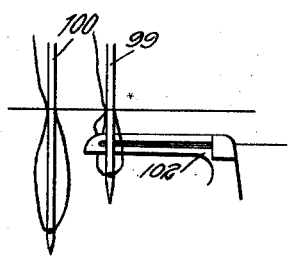
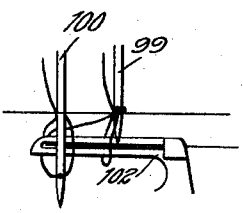
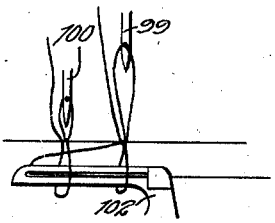
Fig. 23.  Fig. 22.
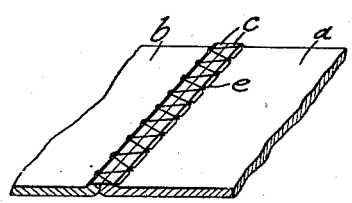
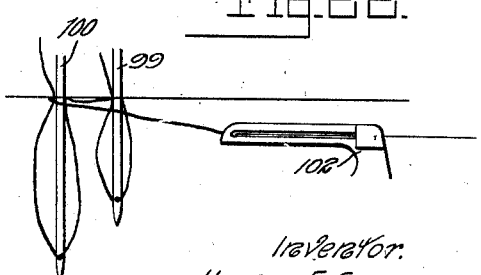
Inventor:
HORACE F. GRUMAN.
By John N. Brunninga
Attorney.

Patented Mar. 11, 1930

1,750,041

UNITED STATES PATENT OFFICE

HORACE F. GRUMAN, OF RICHMOND HEIGHTS, MISSOURI, ASSIGNOR TO LEWIS INVISIBLE STITCH MACHINE COMPANY, OF KITTERY, MAINE, A CORPORATION OF MAINE

SEWING MACHINE

Application filed October 29, 1924. Serial No. 746,676.

This invention relates to sewing machines, and more particularly to machines adapted for the stitching of fabrics.

In the stitching of fabrics, it is often necessary to cover-seam the joined edges of the material; this is especially necessary where the joined edges are trimmed and where this trim must be close to the joining seam.

One of the objects of this invention, therefore, is to provide coordinated and combined mechanisms adapted to not only join-seam the material but also cover-seam the same.

Another object is to provide coordinated and combined mechanisms adapted to successively join-seam the material, trim the joined material, and cover-seam the trimmed material.

In the stitching of knitted fabrics, such as jerseys and sweaters, the fabric is liable to stretch and difficulty is, therefore, experienced in properly feeding the same, since the material is subject to buckling.

Another object of this invention, therefore, is to provide a sewing machine having work-feeding mechanism so constructed and arranged as to prevent buckling of the material during the feeding and the stitching operation.

Another object is to provide improved stitch forming mechanism generally, improved take-up mechanisms, improved looper mechanism, and improvements in the mechanism generally.

Further objects will appear from the detail description taken in connection with the accompanying drawings, in which:

Figure 1 is a front elevation of a machine embodying this invention, part of the housing being cut away to show the interior construction;

Figure 2 is a view similar to Figure 1, taken from the opposite side of the machine;

Figure 3 is a section on the line 3—3, Figure 1, showing the parts in elevation;

Figure 4 is a detail end elevation, parts being omitted to show the feeding mechanism;

Figure 5 is a section on the line 5—5, Figure 4;

Figure 6 is a section on the line 6—6, Figure 4;

Figure 8 is a detail, partly in section, showing the front looper operating mechanism;

Figure 9 is a detail of Figure 8;

Figure 12 is a perspective view of the folder;

Figures 13 and 14 are perspective views, showing the operation of the combined mechanism;

Figures 15, 16, 17 and 18 are views illustrating the formation of the join-seam; and Figures 19, 20, 21, 22 and 23 are like views illustrating the formation of the cover-seam.

Figure 11:
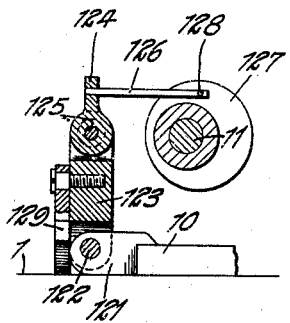
Figure 11 is a section on the line 11—11, Figure 3, showing the take-up for the back looper.

In Figures 15 to 17 inclusive and 19 to 22 inclusive the line $x$ indicates the center line or line of jointure of the two pieces of material.

Referring to the accompanying drawings, and more particularly to Figures 1, 2 and 3, the machine, generally stated, embodies a base 1 having an over-hanging arm 2 as usual in machines of this type. The base 1 has mounted therein in suitable bearings 3, a drive-shaft 4 provided with a pulley 5 whereby the shaft may be driven from any suitable source of power. This shaft 4 has suitable driving connections with a counter-shaft 6 extending along the arm 2, these driving connections being of any suitable form well known to those skilled in the art, the drive being accomplished through a vertical shaft 7 connecting the shafts 4 and 6, by means of any suitable gearing, such gearing being generally shown as spiral gear elements 8 and 9 in Figure 3.

Figure 10:
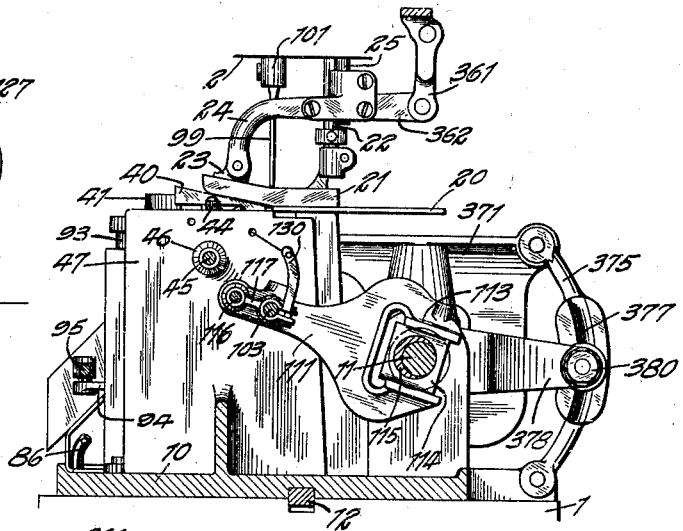
Figure 10 is a section on the line 10—10, Figure 3, showing the back looper operating mechanism.

Mounted on the base 1 is a support 10 carrying various mechanisms as hereinafter described, and including a shaft 11. This support is arranged for detachable mounting on the base and is arranged to be located in position by a key 12, (Figures 7 and 10) entering the key-ways in the base and support, while the parts are so secured in any suitable means as by nuts 13 on bolts on the base entering slots in the support 10 as shown in Figure 3. The shaft 11 has a coupling 14 provided with a stem 15 adapted to enter a coupling in the shaft 4 and an additional coupling element 17 also on the coupling 14 and which also enters the coupling element 16. Accordingly the support with its mechanism may not only be placed on the base but the mechanism on the support may be coupled with the driving mechanism on the base.

Work feeding mechanism

Referring to Figures 1 to 6 inclusive, the support 10 carries a work-support or work-table 20 with which cooperates a presser-foot 21 mounted on a shank 22 in the arm 2. This presser-foot is held down by a spring 18 engaging an arm on the shank and is raised by a manually operated lever 19. The presser-foot is slotted and these slots are arranged to accommodate a series of feeding fingers 23 fixed to the lower end of a shank 25. These feeding fingers are connected to the arm by a clamping screw 26, the arm 24 being slotted to provide a pair of spaced lugs in order to clamp therebetween a lug on the feeding fingers. In this way the angularity of the feeding fingers with respect to the arm may be adjusted.

The shank 25 is mounted to slide in a sleeve 27, Figure 6, which in turn slides in the end of a guide 28 having a stub-shaft 29 mounted to oscillate in the head 2. The sleeve 27 has a lug 30 slidable in a transverse guide in the arm 31 pivoted at 32 in the head as shown in Figures 4, 5 and 6 and having a fork 33 embracing an eccentric 34 on the shaft 6.

The shank 25 has a collar 35 fixed thereto and this collar is engaged by a spring 36 whose other end is engaged by an adjustable sleeve 360 loose on the shank 25 and threaded into the sleeve 27. Accordingly the shank 25 and its feeding-fingers 23 are under the tension of the spring 36.

A lever 361 is pivoted intermediate its ends on the head 2 and has its lower end connected by a link 362 with the arm 24. The upper arm of the lever (see also Figure 2) has a slot 363 engaged by a block 364 arranged to be clamped in adjusted position in the slotted arm 365 of a bell-crank lever by means of an adjustable nut 366. This bell crank lever is pivoted on a stub-shaft 367 in the head 2 while the other arm 368 of the bell crank lever has a fork engaging an eccentric 369 on the shaft 6.

With the mechanism described the feeding fingers 23 are given a movement along the slotted presser-foot and also an up and down movement so as to provide the usual feeding action, the eccentric 34 and its connections imparting the up and down movement, while the eccentric 369 and its connections provide the forward and back movement. The feed can be varied by adjustment of the block 364 and the presser-foot as a whole may be raised or lowered by manipulation of the lever 19. A yielding connection is provided between the sleeve 27 and the feeding fingers 23 and the tension may be adjusted by manipulation of the adjusting sleeve 360.

Referring now to Figures 2, 3, 4, 5 and 10, cooperating with the feeding fingers 23 are complementary fingers 370 adjustably mounted on a carrier 371 which has a slotted part 372 mounted on a block 373 on an eccentric 374 on the shaft 11. The carrier 371 has a pivotal connection with an arm 375 pivoted at 376 on the support 10 and provided with a guideway 377 engaged by a block on a link 378 having a head 379 cooperating with an eccentric on the shaft 11. The block may be moved along the guide 377 and clamped in any adjusted position by the nut 380. By the mechanism described, the feeding fingers 370 are given a complementary movement in order to cooperate with the fingers 23 to feed the work.

Join-seaming mechanism

The operation of join-seaming the pieces of material and of cover-seaming the same is generally shown in Figures 18 and 23, except that the material is shown inverted. In Figure 18, pieces a and b have their edges c turned down into joinable relation, and these edges are secured by a line of stitches d in order to provide the join-seam. After the edges c are trimmed close to the seam d as shown in Figure 23, a line of stitches e passes through the pieces a and b and crosses the trimmed edges c in order to provide a cover seam. The mechanisms for performing these operations will now be described.

The pieces a and b are passed through a guide or folding device shown in Figure 1 and also in detail in Figure 12, and comprising a channel 37 divided by a web 38 and having a head 39 in order to provide a folding device which folds the edges c down and places them in joinable relation. This folding device is arranged directly in front of the join-seaming stitch-forming mechanism as hereinafter described, and guides the pieces of material thereto, the work-support or table 20 being provided with a projection 40 (Figures 3, 13 and 14) in order to provide a guide while a cooperating guide 41 is mounted on a bracket 42 on the support 10.

Referring now to Figures 1, 3, 7, 8, 9, 13 and 14, the join-seaming stitch-forming mechanism comprises an eye-pointed needle 43 arranged to pass through a perforation in the guide 41 and fixed to a head 44 on a bar 45 sliding in bearings 46 in brackets 47 on the support 10. The bar 45 has fixed thereto a head 48 connected by a link 49 with an eccentric strap 50 connected in turn by a link 51 with a bearing 52 on the base 1. The eccentric strap 50 embraces an eccentric 53 on the shaft 7 so that during the rotation of the shaft 7, the needle bar 45 and its attached needle 43 will be reciprocated. The link 49 is detachably connected with the head 48 by means of a screw 54 and the end bearing 46 has a thread-guide 55 thereon.

The looper 56 cooperating with the needle 43 has its shank 57 fixed to a slide 58 moving vertically in a guide-way in a carrier 59 pivoted on a stub-shaft 60 mounted in a bearing 61 on the support and retained by a headed screw 62. The looper is mounted for vertical adjustment in the slide and is locked in adjusted position by a set screw 63.

The carrier 59 has a boss 65 in which is fixed a shank 66 by a set-screw 67 and on this shank is an eccentric 68 having a knurled head 69 adjustable on the shank and fixed in position by a nut 70. The eccentric 68 receives the head 71 on one end of a pitman 72 having at its other end a strap 73 (Figure 3) encircling an eccentric on the shaft 11. By means of this mechanism the carrier 59 is vibrated from the shaft 11 and the position of the looper can be adjusted with respect to the crank on the shaft 11 by adjustment of the eccentric 68.

Figure 7:
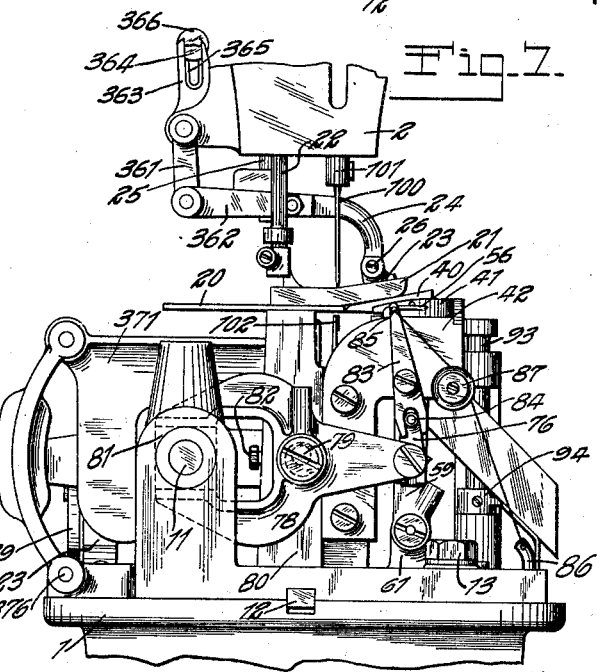
Figure 7 is an end elevation showing the front looper operating mechanism, and other parts.

The slide 58 (Figures 7 and 8) has a boss 74 in which is fixed a stub-shaft 75 engaged by one end of a link 76, the other end of which has a pivot 77 connecting with one arm of a lever 78 pivoted on an eccentric 79 on a bearing-bracket 80. The other arm of the lever 78 is forked and embraces a block 81 engaging another crank on the shaft 11. The eccentric 79 can be adjusted by a slotted head as shown in Figure 7 and can be locked in adjusted position by the set-screw 82. The looper 56 is reciprocated vertically from the shaft 11 by the connections just described and the vertical position of this looper may be adjusted by adjustment of the eccentric 79 and by manipulation of the screw 63.

Mounted on the bracket 42 is a take-up 83 pivoted intermediate its ends and provided at its lower end with a fork engaging a cam roll 84 on the end of the stub-shaft 75. Accordingly this take-up is operated to take up the looper thread which passes from a suitable source of supply through an eye 85, Figure 1, through the guide 64, a guide 86, Figures 3 and 7, a thread tension 87, the take-up 83 and the looper. This looper 56 also cooperates with a spreader 88 also mounted on the carrier 59 as shown in Figures 8 and 9; the spreader shank is slotted and is clamped in adjusted position by screws 880.

The thread for the needle 43 passes from a suitable source of supply through a tension-device 89, Figure 1, a guide 90, through the base 1, guide 55, through perforations in the bracket 47, through a perforation in the head 44, and to the needle.

The operation of the join-seaming mechanism is indicated in Figures 15, 16 and 17 and also in Figures 13 and 14, while the seam formed is shown in Figure 18, but inverted. The mechanism is constructed for adjustment to secure proper timed relation of the component mechanisms.

The trimming mechanism

During the formation of the join-seaming stitch d, the edges c are trimmed close to the seam, and arranged adjacent the join-seaming stitch-forming mechanism is trimming mechanism for accomplishing that purpose. This trimming mechanism (Figures 1, 2, 3, 13 and 14) comprises a stationary cutter 91 on the guide 41, with which cooperates a movable cutter 92 on a rock shaft 93 having an arm 94 connected by a link 95 with an arm 96 pivoted intermediate its ends on the support 10 and having at its end a cam roll 97 cooperating with a cam 98 fixed to the shaft 11. Upon rotation of the shaft 11 the cutter 92 will be vibrated to cooperate with the stationary cutter 91 in order to trim the edges c, and since the material pieces a and b lie upon the support portions 40 and 41 which are spaced a definite distance above the cooperating cutters 91 and 92, the edges c will be trimmed uniformly as the material is fed by the feeding device 30, and the trimming can be close to the seam.

Cover-seaming mechanism

After the material has been join-seamed and trimmed, it is cover-seamed, and located in the back of the trimming mechanism is a cover-seaming stitch-forming mechanism which will now be described.

Referring to Figures 1, 2, 3, 4, 5, 10, 11, 12, 13, 14, and 19 to 23 inclusive, the mechanism comprises two needles 99 and 100, one of which is set in advance of the other, as shown in Figure 13, and such needles are mounted on a needle bar 101 reciprocated from the shaft 6 by a crank 151 and link 150 (Figures 4 and 5). These needles pass through the presser-foot 21 and cooperate with a looper 102 on the end of a looper bar 103, which looper bar is slidable in bearings 104 in the brackets 47. The looper bar and its attached looper are reciprocated by an eccentric 105 on the shaft 7 cooperating with a strap 106 connected at one end to a link 107, the other end of which is pivotally connected with the bearing 52. The other end of the strap 106 is pivotally connected to one end of a link 108, the other end of which is pivotally and detachably connected to a head 109 on the looper bar 103 by a screw 110.

The left bearing 104, Figure 3, is a sleeve and has pivoted thereon a rocker 111 (Figures 3 and 10) which is secured by a collar 112 and has a fork 113 engaging a block 114 on an eccentric 115 on the shaft 11. The other end of the rocker carries a shank 116 which has slidable thereon a head 117 clampingly fixed to the looper bar 103. Accordingly during the reciprocation of the looper bar, this bar is also given a rocking movement so that the looper will be reciprocated as well as rocked in order to cooperate with the needle in order to provide zig-zag coverstitches e as shown in Figure 23.

The needle threads each pass through a source of supply through a tension-device 118, thence through a thread-lock 119, through a guide 120, and thence to the eye-pointed needles 99 and 100. The tension 118 and the thread-lock 119 may be of any usual and suitable construction, the tension having a release 382, while the thread-lock is operated from the shaft 6 in the usual manner. The thread for the looper 102 passes from a suitable source of supply through take-up devices which will now be described.

Referring to Figures 3 and 11, formed on the support 10 is a bearing lug 121 having pivoted thereon at 122 a carrier 123. The upper end of this carrier is bifurcated and receives a fork 124 which is swiveled on the carrier 123 by means of a clamping screw 125; accordingly the fork can be adjusted on the screw and clamped between the bifurcated ends of the carrier 123 by tightening the screw. The fork 124 has a series of prongs 126, in this case three, which span a series, in this case two, of eccentrics or rotatable elements 127 fixed to the shaft 11. The prongs 126 are perforated at their ends as shown at 128 to receive the thread; accordingly upon rotation of the eccentrics, they will by their engagement with the thread spanning the ends of the fork, serve to take up the thread from the source of supply and from the looper. In order that the carrier 123 may be swung out of operative position, it is pivoted on the lug 121 as described, and in order to hold it in position, this carrier has a latch element 129 which engages the base 1. From the take-up and measuring device just described, the looper thread passes to a take-up arm 130, Figures 3 and 10, mounted upon the rocker 111. The thread then passes to the looper 102.

The operation of the cover-seaming mechanism is shown in Figures 19 to 22 inclusive and also Figures 13 and 14, while the seam formed is shown in Figure 23, but inverted, and only the cover-seaming stitch is shown so as to avoid confusion; in practice, however, the cover-seam is applied over the join-seam and after the edges c are trimmed close to the seam.

The loopers 56 and 102 are somewhat similar in construction, except that the latter is longer than the former. Each is pointed, has an eye at its tip, has a groove therealong, which groove at the heel end terminates in a perforation extending along the looper and opening at the heel. The operation of these looping devices is generally understood in the art and their action is generally illustrated in Figures 13 to 23 inclusive.

It will thus be seen that the invention accomplishes its objects. The pieces of material are placed in joining relation, in this particular embodiment by a folding device, and are maintained in that relation until operated upon by the join-seaming mechanism. This mechanism operates to join the folded-down edges of the material as shown in Figure 18, while the feeding mechanism operates to feed the material in order to run the stitch along the seam to be made. This feeding mechanism also operates to feed the material to the trimming mechanism, which trimming mechanism operates to trim the joined pieces of material. The feeding mechanism then operates to place the trimmed material in cooperative relation with the cover-seaming mechanism and the seam is there completed by passing cover-seam stitches through the material and over the trimmed edges thus formed. The mechanism is, therefore, entirely automatic in its action and operates continuously to completely join-seam, trim, and cover-seam the pieces of material.

The work-feeding mechanism is constructed and arranged so as to prevent buckling of the material. This is accomplished by causing the stroke of the top feeding elements 23 to be greater than that of the bottom feeding elements 370. Accordingly the material will be fed up to the needles 100 somewhat faster than it is taken away from these needles by the feeding elements 370. This, together with the relative position of the feeding elements 23 slightly in advance of the needle 43 and associated mechanisms, will cause the same to be smooth and even and also flat so that no buckling will take place.

It will be noted that in the organization of this machine the vertically reciprocating needle bar and its driving mechanism are mounted on the arm 2 above the work. The nature of this mechanism is such that it may be rigidly supported on the arm so that practically no play or spring are possible in the movement of the parts. The rest of the mechanism is mounted in the bed of the machine below the work. By this construction the supports for the moving parts may be brought close to those parts, so that long overhanging arms and levers are avoided. This also provides for rigid support of the parts and the elimination of play or spring therein. It will be clear, therefore, that improved precision of action for the whole mechanism is obtained by this construction.

Attempts have been made to construct machines capable of performing the combined join-seaming and cover-seaming operations, but without practical success partly on account of the lack of precision of movement at the high speeds required in modern machines of this kind. With the machine of this invention, operating speeds up to 3500 R. P. M. have been obtained and maintained under practical working conditions.

It is obvious that various changes may be made in details of construction without departing from the spirit of this invention; it is, therefore, to be understood that this invention is not to be limited to the specific details shown and described.

Having thus described the invention, what is claimed is:

1. In a sewing machine of the character described, the combination with stitch-forming mechanism adapted to join-seam the material, of stitch-forming mechanism adapted and arranged to cover-seam the material after the same is join-seamed by said first mechanism, and means for feeding the material from said first to said second mechanism including, an upper feeder, a lower feeder, and means for moving said upper feeder at a greater rate than said lower feeder.

2. In a sewing machine of the character described, the combination with stitch-forming mechanism adapted to join-seam the material, of stitch-forming mechanism arranged back of said first mechanism and adapted to cover-seam the material joined thereby, and means for feeding the material from said first to said second mechanism, including, a feeder between said mechanisms.

3. In a sewing machine of the character described, the combination with stitch-forming mechanism adapted to join-seam the material, of stitch-forming mechanism arranged back of said first mechanism and adapted to cover-seam the material joined thereby, and means for feeding the material from said first to said second mechanism including, an upper feeder between said mechanisms and a lower feeder in back of said cover-seaming mechanism.

4. In a sewing machine of the character described, the combination with stitch-forming mechanism adapted to join-seam the material, of stitch-forming mechanism arranged back of said first mechanism and adapted to cover-seam the material joined thereby, and means for feeding the material from said first to said second mechanism including, an upper feeder between said mechanisms and a lower feeder in back of said cover-seaming mechanism, and means for moving said upper feeder at a greater rate than said lower feeder.

5. In a sewing machine of the character described, the combination with stitch-forming mechanism adapted to join-seam the material, of mechanism adapted to trim the joined material, and stitch-forming mechanism adapted to cover-seam the trimmed material, and means for feeding the material at a greater rate at the top than at the bottom.

6. In a machine of the character described, a work table, a longitudinally reciprocating horizontal needle bar operating below said table, stitch forming mechanism cooperating with said needle bar to join-seam the material, a longitudinally reciprocating vertical needle bar having stitch forming mechanism cooperating therewith to cover-seam the joined material, and means for feeding the material.

7. In a machine of the character described, a work table, a longitudinally reciprocating horizontal needle bar operating below said table, stitch forming mechanism cooperating with said needle bar to join-seam the material, a longitudinally reciprocating vertical needle bar, looper mechanism mounted below said table and cooperating with said vertical needle bar to cover-seam the material, and means for feeding the material.

8. In a machine of the character described, a work table, a longitudinally reciprocating horizontal needle bar operating below said table, stitch forming mechanism cooperating with said needle bar to join-seam the material, a longitudinally reciprocating vertical needle bar, a longitudinally reciprocating horizontal looper carrier having a looper thereon operating below said table and cooperating with said vertical needle bar to cover-seam the material, and means for feeding the material.

9. In a machine of the character described, a work table, a longitudinally reciprocating horizontal needle bar operating below said table, stitch forming mechanism below said table cooperating with said needle bar to join-seam the material, a longitudinally reciprocating vertical needle bar having stitch forming mechanism cooperating therewith to cover-seam the joined material, and means for feeding the material.

10. In a machine of the character described having a base and an arm overhanging said base, a work support on said base, means for folding down the edges of pieces of material over said support and for guiding them in joinable relation, stitch-forming mechanism including a needle bar movable on said base transversely of the folded edges adapted to join seam the same, a needle bar movable vertically on said arm, and stitch-forming mechanism on said base cooperating with the vertically moving needle and operating on the under side of the joined edges adapted to cover-seam the same.

11. In a machine of the character described having a base and an arm overhanging said base, a work support on said base, means for folding down the edges of pieces of material over said support and for guiding them in joinable relation, stitch-forming mechanism including a needle bar movable on said base transversely of the folded edges adapted to join seam the same, a trimmer on said base below said support adapted to trim the joined edges, a needle bar movable vertically on said arm, and stitch-forming mechanism on said base cooperating with the vertically moving needle and operating on the under side of the joined edges adapted to cover-seam the same.

12. In a machine of the character described having a base and an arm overhanging said base, a work support on said base, means for folding down the edges of pieces of material over said support and for guiding them in joinable relation, stitch-forming mechanism including a needle bar sliding on said base transversely of the folded edges adapted to join seam the same, a needle bar sliding vertically on said arm, and stitch-forming mechanism on said base cooperating with the vertically moving needle and operating on the under side of the joined edges adapted to cover-seam the same.

13. In a machine of the character described, a work support, means for folding the edges of pieces of material over said support and for guiding them in joinable relation, stitch forming mechanism including a needle bar sliding transversely of the folded edges adapted to join seam the same, a needle bar sliding transversely of said first needle bar, and stitch-forming mechanism cooperating with said second needle bar to cover-seam the joined edges.

14. In a machine of the character described, a work support, means for folding the edges of pieces of material over said support and for guiding them in joinable relation, stitch forming mechanism including a needle bar sliding transversely of the folded edges adapted to join seam the same, means for trimming the joined edges, a needle bar sliding transversely of said first needle bar, and stitch-forming mechanism cooperating with said second needle bar to cover-seam the joined edges.

In testimony whereof I affix my signature this 26th day of September, 1924.

HORACE F. GRUMAN.